United States Patent
Chen et al.

(10) Patent No.: US 10,212,661 B2
(45) Date of Patent: *Feb. 19, 2019

(54) MAPPING AN ENHANCED PHYSICAL DOWNLINK CONTROL CHANNEL

(71) Applicant: Intel Corporation, Santa Clara, CA (US)

(72) Inventors: Xiaogang Chen, Hillsboro, OR (US); Jong-Kae Fwu, Sunnyvale, CA (US); Hong He, Beijing (CN); Yuan Zhu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 15/130,875

(22) Filed: Apr. 15, 2016

(65) Prior Publication Data

US 2016/0234815 A1 Aug. 11, 2016

Related U.S. Application Data

(63) Continuation of application No. 13/977,523, filed as application No. PCT/CN2012/082519 on Oct. 3, 2012, now Pat. No. 9,351,311.

(Continued)

(51) Int. Cl.
*H04W 72/04* (2009.01)
*H04W 72/12* (2009.01)
(Continued)

(52) U.S. Cl.
CPC ........ *H04W 52/0222* (2013.01); *H04B 7/024* (2013.01); *H04B 7/0417* (2013.01);
(Continued)

(58) Field of Classification Search
CPC .... H04B 7/024; H04B 7/0417; H04B 7/0456; H04B 7/0615; H04B 7/0619;
(Continued)

(56) References Cited

U.S. PATENT DOCUMENTS 7,733,827 B2 6/2010 Kim et al.
8,254,245 B2 8/2012 Kim et al.
(Continued)

FOREIGN PATENT DOCUMENTS

CN 01989898 A 3/2011
WO 2010053984 A2 5/2010

OTHER PUBLICATIONS

International Search Report and Written Opinion dated Jan. 17, 2013 from International Application No. PCT/CN2012/082519, 11 pages.

(Continued)

*Primary Examiner* — Ahmed Elallam
(74) *Attorney, Agent, or Firm* — Schwabe, Williamson & Wyatt, P.C.

(57) ABSTRACT

Technology for mapping an enhanced physical downlink control channel to physical resource blocks in a radio frame is disclosed. One method comprises mapping modulated symbols in the ePDCCH to at least one control channel element. The at least one control channel element may be mapped to resource elements located in a plurality of distributed physical resource blocks in a subframe, wherein each resource block is in a distributed resource block group and is separated by at least one additional resource block in the subframe. The mapping may also be to resource elements distributed in a single resource block in the subframe, wherein the control channel element is mapped to be distributed in frequency and time relative to other mapped resource elements in the single resource block and the single resource block belongs to a localized resource block group.

14 Claims, 7 Drawing Sheets

Related U.S. Application Data (60) Provisional application No. 61/542,086, filed on Sep. 30, 2011.

(51) Int. Cl.

| | | |
|---|---|---|
| *H04B 7/04* | (2017.01) | |
| *H04L 5/00* | (2006.01) | |
| *H04W 52/02* | (2009.01) | |
| *H04W 48/16* | (2009.01) | |
| *H04B 7/06* | (2006.01) | |
| *H04B 7/0456* | (2017.01) | |
| *H04L 12/891* | (2013.01) | |
| *H04W 52/04* | (2009.01) | |
| *H04W 4/08* | (2009.01) | |
| *H04W 36/00* | (2009.01) | |
| *H04L 12/18* | (2006.01) | |
| *H04W 4/06* | (2009.01) | |
| *H04W 72/00* | (2009.01) | |
| *H04L 12/709* | (2013.01) | |
| *H04W 48/18* | (2009.01) | |
| *H04W 72/08* | (2009.01) | |
| *H04B 7/024* | (2017.01) | |
| *H04B 7/0417* | (2017.01) | |
| *H04W 52/14* | (2009.01) | |
| *H04W 76/34* | (2018.01) | |
| *H04W 76/28* | (2018.01) | |
| *H04W 76/40* | (2018.01) | |
| *H04W 84/04* | (2009.01) | |
| *H04W 52/54* | (2009.01) | |
| *H04L 25/02* | (2006.01) | |
| *H04W 28/10* | (2009.01) | |
| *H04W 52/24* | (2009.01) | |
| *H04W 52/36* | (2009.01) | |
| *H04W 48/12* | (2009.01) | |

(52) U.S. Cl.
CPC ......... *H04B 7/0456* (2013.01); *H04B 7/0615* (2013.01); *H04B 7/0619* (2013.01); *H04L 5/0032* (2013.01); *H04L 5/0037* (2013.01); *H04L 12/189* (2013.01); *H04L 45/245* (2013.01); *H04L 47/41* (2013.01); *H04W 4/06* (2013.01); *H04W 4/08* (2013.01); *H04W 36/0005* (2013.01); *H04W 36/0007* (2018.08); *H04W 48/16* (2013.01); *H04W 48/18* (2013.01); *H04W 52/0235* (2013.01); *H04W 52/04* (2013.01); *H04W 52/146* (2013.01); *H04W 72/005* (2013.01); *H04W 72/042* (2013.01); *H04W 72/0446* (2013.01); *H04W 72/082* (2013.01); *H04W 72/1215* (2013.01); *H04W 72/1278* (2013.01); *H04W 72/1294* (2013.01); *H04W 76/28* (2018.02); *H04W 76/34* (2018.02); *H04W 76/40* (2018.02); *H04B 7/0613* (2013.01); *H04L 25/0204* (2013.01); *H04W 28/10* (2013.01); *H04W 48/12* (2013.01); *H04W 52/244* (2013.01); *H04W 52/365* (2013.01); *H04W 52/54* (2013.01); *H04W 72/0426* (2013.01); *H04W 84/042* (2013.01); *Y02D 70/00* (2018.01); *Y02D 70/1222* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/168* (2018.01); *Y02D 70/21* (2018.01); *Y02D 70/23* (2018.01); *Y02D 70/24* (2018.01); *Y02D 70/444* (2018.01)

(58) Field of Classification Search
CPC ..... H04B 7/0613; H04L 45/245; H04L 47/41; H04L 5/0032; H04L 5/0037; H04L 12/189; H04L 25/0204; H04W 28/042; H04W 36/0005; H04W 4/06; H04W 4/08; H04W 48/16; H04W 48/18; H04W 52/0222; H04W 52/0235; H04W 72/005; H04W 72/042; H04W 72/0446; H04W 72/082; H04W 72/1215; H04W 72/1278; H04W 72/1294; H04W 76/048; H04W 76/064; H04W 28/10; H04W 48/12; H04W 52/244; H04W 52/365; H04W 52/05; H04W 72/04; H04W 72/0406; H04W 84/042; Y02B 60/50
See application file for complete search history.

(56) References Cited

U.S. PATENT DOCUMENTS

| | | | |
|---|---|---|---|
| 8,559,963 B2 | 10/2013 | Nishio et al. | |
| 9,131,490 B2 | 9/2015 | Feng et al. | |
| 9,173,213 B2 * | 10/2015 | Golitschek | H04L 5/0037 |
| 9,351,311 B2 * | 5/2016 | Chen | H04W 52/04 |
| 9,413,509 B2 * | 8/2016 | Chen | H04W 28/06 |
| 9,420,578 B2 * | 8/2016 | Feng | H04L 5/0007 |
| 9,445,413 B2 * | 9/2016 | Seo | H04W 12/00 |
| 9,510,340 B2 | 11/2016 | Kim | H04L 5/0053 |
| 9,538,507 B2 * | 1/2017 | Ji | H04L 5/0026 |
| 9,642,180 B2 * | 5/2017 | Chen | H04B 15/00 |
| 9,794,913 B2 * | 10/2017 | Lee | H04L 5/0053 |
| 9,935,754 B2 * | 4/2018 | Golitschek | H04L 5/0037 |
| 2009/0088148 A1 | 4/2009 | Chung et al. | |
| 2010/0035555 A1 | 2/2010 | Bala et al. | |
| 2010/0118800 A1 | 5/2010 | Kim et al. | |
| 2010/0195583 A1 * | 8/2010 | Nory | H04L 1/1854 370/329 |
| 2011/0038303 A1 | 2/2011 | Ji et al. | |
| 2011/0044391 A1 * | 2/2011 | Ji | H04L 5/0007 375/260 |
| 2011/0085506 A1 | 4/2011 | Lee et al. | |
| 2011/0261767 A1 | 10/2011 | Ji et al. | |
| 2011/0273996 A1 | 11/2011 | Kim et al. | |
| 2012/0281640 A1 | 11/2012 | Xu et al. | |
| 2012/0320846 A1 * | 12/2012 | Papasakellariou | H04W 72/042 370/329 |
| 2013/0003604 A1 | 1/2013 | Blankenship et al. | |
| 2013/0044727 A1 | 2/2013 | Nory et al. | |
| 2013/0182664 A1 * | 7/2013 | Chen | H04W 72/042 370/329 |
| 2013/0194931 A1 * | 8/2013 | Lee | H04L 5/0053 370/241 |
| 2013/0215842 A1 * | 8/2013 | Han | H04W 72/042 370/329 |
| 2013/0230017 A1 * | 9/2013 | Papasakellariou | H04W 72/0406 370/330 |
| 2013/0294368 A1 * | 11/2013 | Bendlin | H04W 72/042 370/329 |
| 2014/0126487 A1 | 5/2014 | Chen et al. | |
| 2015/0139149 A1 | 5/2015 | Feng et al. | |
| 2016/0073383 A1 * | 3/2016 | Han | H04W 72/042 370/329 |
| 2016/0249334 A1 * | 8/2016 | Feng | H04L 5/0007 |

OTHER PUBLICATIONS

Office Action dated Jul. 16, 2015 from U.S. Appl. No. 13/977,523.
Extended European Search Report dated Aug. 24, 2015 from European Patent Application No. 12835272.

(56) References Cited

OTHER PUBLICATIONS

Notice of Allowance dated Jan. 29, 2016 from U.S. Appl. No. 13/977,523.
First Office Action dated May 25, 2017 from Chinese Patent Application No. 201280058219.6, 12 pages.
Panasonic, "Multiplexing of ePDCCHs and ePDCCH RE mapping," 3GPP TSG RAN WG1 Meeting #68bis, R1-121163, Mar. 30, 2012 (Mar. 30, 2012), 5 pages.
Mitsubishi Electric, "Mapping Rule of Distributed Resource Allocation," 3GPP TSG RAN WG1 #51bis, Tdoc R1-080113, Jan. 18, 2008 (Jan. 18, 2008), 4 pages.
3GPP, "Physical Channels and Modulation (Release 10)," 3GPP TS 36.211 V10.2.0, Jun. 2011, 103 pages.
3GPP, "LTE; Evolved Universal Terrestrial Radio Access (E-UTRA); Physical channels and modulation," (3GPP TS 36.211 version 10.2.0 Release 10) ETSI TS 136 211 V103230 (Jun. 2011) Technical Specification, European Telecommunications Standards Institute (ETSI), 650, Route Des Lucioles; F-06921 Sophia-Antipolis; France, CP014066382, whole document.
3GPP TS 36.216 v10.1.0, 3rd Generation Partnership Project; Technical Specification Group Radio Access Network; Evolved Universal Terrestrial Radio Access (E-UTRA); Physical layer for relaying operation (Release 10) (Dec. 2010) 15 pgs.
3GPP TS 36.213 V10.1.0, 3rd Generation Partnership Project; Technical Specification Group Radio Access Network; Evolved Universal Terrestrial Radio Access (E-UTRA); Physical layer procedures (Release 10) (Mar. 2011) 115 pgs.
3GPP, "Discussions on UE-RS Based PDCCH," 3GPP TSG RAN WG1 Meeting #65, R1-111594, Barcelona, Spain, May 9-13, 2011, 3 pgs.
Ericsson et al., "On Downlink control signalling enhancements," 3GPP TSG-RAN WG1 #66, Tdoc R1-112292, Agenda Item: 6.6.2.2, Aug. 22-26, 2011, Athens, Greece, 2 pages.

\* cited by examiner

MAPPING AN ENHANCED PHYSICAL DOWNLINK CONTROL CHANNEL

CLAIM OF PRIORITY

This application is a continuation to U.S. patent application Ser. No. 13/977,523, filed Sep. 3, 2013, which is a U.S. National Phase application under 35 U.S.C. § 371 of International Application No. PCT/CN2012/082519, filed Oct. 3, 2012, entitled "MAPPING AN ENHANCED PHYSICAL DOWNLINK CONTROL CHANNEL," which claims priority to U.S. Provisional Patent Application Ser. No. 61/542,086, filed on Sep. 30, 2011, and which is hereby incorporated by reference.

BACKGROUND

Wireless mobile communication technology uses various standards and protocols to transmit data between a base transceiver station (BTS) and a wireless mobile device. In the third generation partnership project (3GPP) long term evolution (LTE) systems, the BTS is a combination of an evolved Node Bs (eNode Bs or eNBs) and Radio Network Controllers (RNCs) in a Universal Terrestrial Radio Access Network (UTRAN), which communicates with the wireless mobile device, known as a user equipment (UE). Data is transmitted from the eNode B to the UE via a physical downlink shared channel (PDSCH). A physical downlink control channel (PDCCH) is used to transfer downlink control information (DCI) that informs the UE about resource allocations or scheduling related to downlink resource assignments on the PDSCH, uplink resource grants, and uplink power control commands. The PDCCH signal may be transmitted prior the PDSCH in each subframe transmitted from the eNode B to the UE.

The PDCCH signal is designed to be demodulated at the UE based on a cell specific reference signal (CRS). However, the use of a CRS does not take into account the increased complexities of advanced LTE systems. For instance, in heterogeneous networks, multiple nodes may simultaneously transmit within a single cell. The use of the cell specific reference signal may limit advanced techniques to increase cell capacity.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

The following description may include terms, such as first, second, etc. that are used for descriptive purposes only and are not to be construed as limiting.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

In 3GPP radio access network (RAN) LTE systems, the transmission station may be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless mobile device, known as a user equipment (UE). A downlink (DL) transmission may be a communication from the transmission station (or eNodeB) to the wireless mobile device (or UE), and an uplink (UL) transmission may be a communication from the wireless mobile device to the transmission station.

In homogeneous networks, the transmission station, also called macro nodes, may provide basic wireless coverage to mobile devices in a cell. Heterogeneous networks (HetNets) were introduced to handle the increased traffic loads on the macro nodes due to increased usage and functionality of mobile devices. HetNets may include a layer of planned high power macro nodes (or macro-eNBs) overlaid with layers of lower power nodes (micro-eNBs, pico-eNBs, femto-eNBs, or home eNBs [HeNBs]) that may be deployed in a less well planned or even entirely uncoordinated manner within the coverage area of the macro nodes. The macro nodes may be used for basic coverage, and the low power nodes may be used to fill coverage holes, to improve capacity in high usage locations or at the boundaries between the macro nodes' coverage areas, and improve indoor coverage where building structures impede signal transmission.

The deployment of a HetNet may improve the efficiency of the transmission of data to a UE in a cell, such as data communicated on a physical downlink shared channel (PDSCH). The efficiency is increased by splitting the cell into smaller areas with the additional use of low power nodes.

The communication of data on the PDSCH is controlled via a control channel, referred to as a physical downlink control channel (PDCCH). The PDCCH may be used for downlink (DL) and uplink (UL) resource assignments, transmit power commands, and paging indicators. The downlink PDSCH scheduling grant may be designated to a particular UE for dedicated PDSCH resource allocation to carry UE-specific traffic, or it may be designated to all UEs in the cell for common PDSCH resource allocation to carry broadcast control information such as system information or paging.

The data carried on the PDCCH is referred to as downlink control information (DCI). There are several traditional formats that are defined for a DCI message. For example, defined formats include:

Format 0 for transmission of uplink shared channel (UL-SCH) allocation;

Format 1 for transmission of downlink shared channel (DL-SCH) allocation for Single Input Multiple Output (SIMO) operation;

Format 1A for compact transmission of DL-SCH allocation for SIMO operation or allocating a dedicated preamble signature to a UE for random access;

Format 1B for transmission control information of Multiple Input Multiple Output (MIMO) rank 1 based compact resource assignment;

Format 1C for very compact transmission of PDSCH assignment;

Format 1D, the same as format 1B with additional information of power offset;

Format 2 and Format 2A for transmission of DL-SCH allocation for closed and open loop MIMO operation, respectively; and Format 3 and format 3A for transmission of transmission power control (TPC) command for an uplink channel.

This list is not intended to be complete. Additional formats may also be used. As the complexity of wireless networks increases, such as the use of HetNets having multiple different types of nodes, other formats may be created to carry the desired downlink control information.

Multiple UEs may be scheduled in one subframe of a radio frame. Therefore, multiple DCI messages may be sent using multiple PDCCHs. The DCI information in a PDCCH may be transmitted using one or more control channel elements (CCE). A CCE is comprised of a group of resource element groups (REGs). A legacy CCE may include up to nine REGs. Each REG is comprised of four resource elements. Each resource element may include two bits of information when quadrature modulation is used. Therefore, a legacy CCE may include up to 72 bits of information. When more than 72 bits of information are needed to convey the DCI message, multiple CCEs may be employed. The use of multiple CCEs is referred to as aggregation level. 3GPP LTE Releases 8, 9 and 10 define aggregation levels as 1, 2, 4 or 8 consecutive CCEs allocated to one PDCCH.

Figure 1:
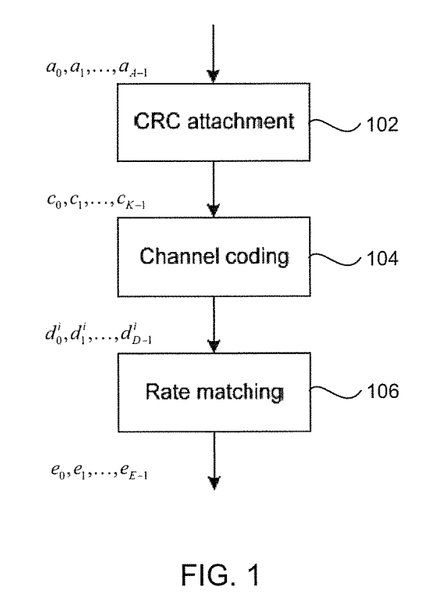
FIG. 1 illustrates a block diagram showing processes performed on downlink control information (DCI) in accordance with an example.

To create the PDCCH payload, the DCI may undergo a number of processes, as illustrated in FIG. 1. The processes may include the attachment of a cyclic redundancy check 102 used for error detection in the DCI message; channel coding 104 for use in forward error correction, and rate matching 106 that is used to output a bit stream with a desired code rate. Detailed instructions for performing the cyclic redundancy check, channel coding, and rate matching are provided in the 3GPP LTE specifications, such as Release 8, 9 and 10.

Figure 2:
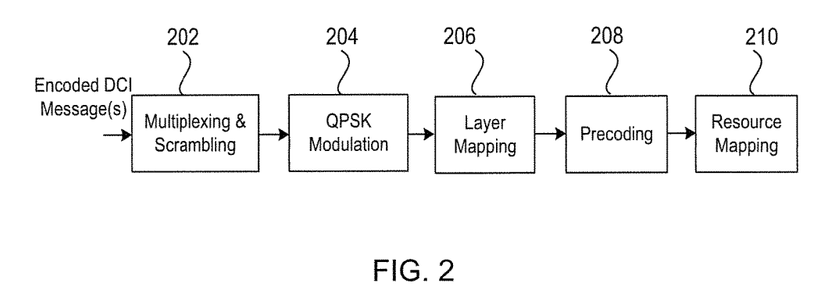
FIG. 2 illustrates a block diagram showing additional processes performed on downlink control information (DCI) in accordance with an example.

The encoded DCI message(s) for each control channel may then be multiplexed and scrambled before undergoing modulation, layer mapping, precoding and resource mapping, as illustrated in the block diagram of FIG. 2.

Blocks of encoded bits for each control channel may be multiplexed 202, e.g., by a multiplexer, to create a block of data. The size of the blocks of data may be altered to ensure that PDCCHs start at a desired CCE position. The size of the blocks of data may also be altered to ensure that the blocks of bits match the amount of REGs that can be used by the PDCCH. The multiplexed block of bits may then be scrambled. One scrambling process that is currently used is the use of a bit-wise XOR operation with a cell specific scrambling sequence. Other types of scrambling may be used as well. The encoding process is outlined in the 3GPP LTE specification.

The scrambled bits may then undergo modulation 204, e.g., by a modulating module. Quadrature Phase Shift Keying (QPSK) is often used to create a block of complex-valued modulation symbols. In other embodiments, other types of modulation, such as Bi-Phase Shift Keying (BPSK), 16 Quadrature Amplitude Modulation (16-QAM), 32-QAM, 64-QAM, and so forth may also be used.

The complex symbols may be mapped 206, e.g., by a layer mapping module, to multiple layers, depending on a number of transmit antennas used at the eNode B. One, two or four layer mapping has been used in legacy systems. Additional layers, such as eight layer mapping may also be used. The mapping process is outlined in the 3GPP LTE specification.

A precoder 208 may take a block from the layer mapper 206 to generate an output for each antenna port. Precoding for transmission diversity may be performed for two or four antennas in legacy systems based on the 3GPP LTE Rel. 8 specification. Transmission diversity for more complex systems, such as an eNode B with eight antennas, may also be applied using precoding. One scheme used for precoding includes the Alamouti scheme for two antennas.

The complex valued symbols for each antenna may then be divided into groups for mapping 210, e.g., by a resource mapping module, to resource elements. In legacy systems, the complex valued symbols for each antenna may be divided into quadruplets. The sets of quadruplets may then undergo a permutation such as interleaving and cyclic shifting before being mapped to resource elements within resource element groups.

The PDCCH may be transmitted prior to the PDSCH in each subframe transmitted from the eNode B to the UE. The demodulation of the PDCCH at the UE may be based on a cell-specific reference signal (CRS). Each cell is only assigned a single reference signal. However, the use of the single CRS may limit the number of nodes that can be deployed in a cell.

A UE may receive a PDCCH using blind decoding. The resources used by the UE for PDCCH blind decoding may be referred to as the search space. A different search space may be used to detect and demodulate an ePDCCH for a UE specific reference signal (UE-RS) relative to the use of a CRS.

Figure 3:
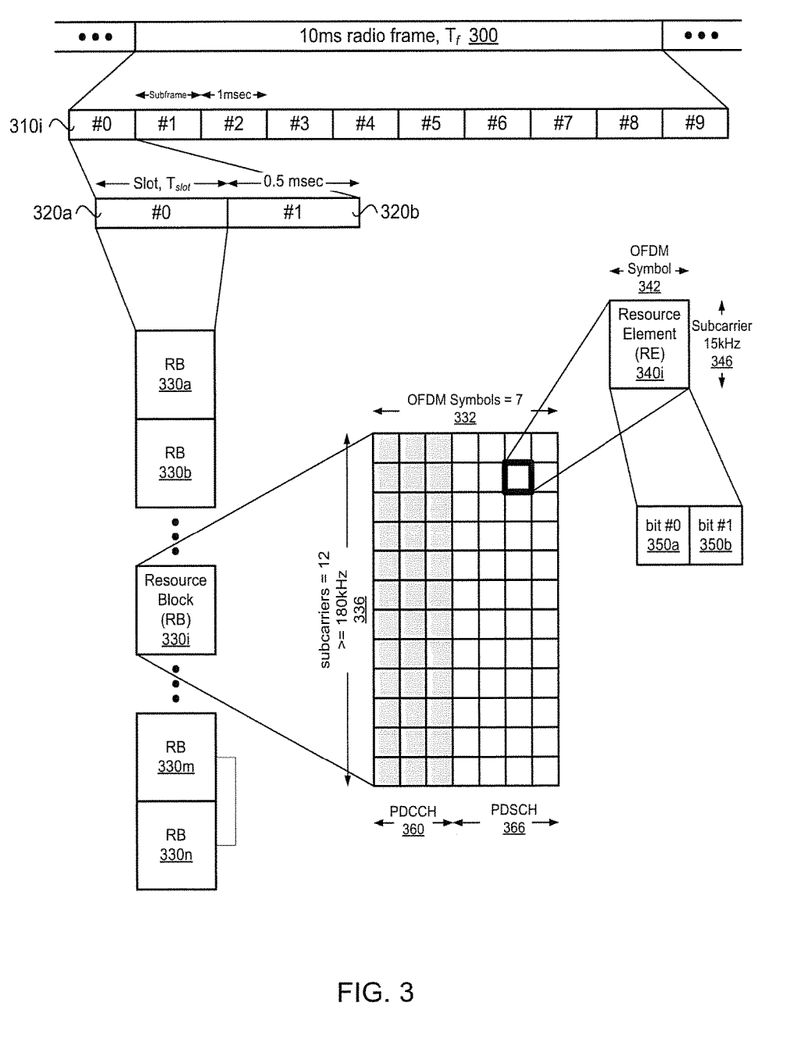
FIG. 3 illustrates a block diagram of a resource grid in accordance with an example.

The signal on the physical (PHY) layer used to convey the PDCCH may be transmitted by the eNode B (enhanced Node B or evolved Node B or eNB) to the user equipment (UE) using a generic long term evolution (LTE) frame structure, as illustrated in FIG. 3. In the illustration of FIG. 3, a legacy PDCCH is illustrated.

A radio frame 300 may have a duration, $T_f$, of 10 milliseconds (ms). Each radio frame may be segmented or divided into ten subframes 310$i$ that are each 1 ms long. Each subframe may be further subdivided into two slots 320$a$ and 320$b$, each with a duration, $T_{slot}$, of 0.5 ms. In a legacy system, the first slot (#0) 320$a$ may include a physical downlink control channel (PDCCH) 360 and a physical downlink shared channel (PDSCH) 366, and the second slot (#2) 320$b$ may include data using the PDSCH. Each slot for a component carrier (CC) used by the eNode B and the UE may include multiple resource blocks (RBs) 330$a$, 330$b$, 330$i$, 330$m$, and 330$n$ based on the CC frequency bandwidth.

Each RB 330$i$ may include 12-15 kHz subcarriers 336 (on the frequency axis) and 6 or 7 orthogonal frequency-division multiplexing (OFDM) symbols 332 (on the time axis) per subcarrier. In one embodiment, the RB may use seven OFDM symbols if short or normal cyclic prefix is employed. In another embodiment, the RB may use six OFDM symbols if an extended cyclic prefix is used. The resource block may be mapped to 84 resource elements (REs) 340$i$ using short or normal cyclic prefixing, or the resource block may be mapped to 72 REs (not shown) using extended cyclic prefixing. The RE may be a unit of one OFDM symbol 342 by one subcarrier (e.g., 15 kHz) 346. Each RE may transmit two bits 350$a$ and 350$b$ of information using QPSK. The actual number of bits communicated per RE is dependent on the level of modulation used.

The control region of each legacy serving cell in carrier aggregation consists of a set of (CCEs). In one embodiment, the CCEs may be numbered from 0 to $N_{CCE,k}-1$, where $N_{CCE,k}$ is the total number of CCEs in the control region of subframe k. The UE may monitor a set of PDCCH candidates on one or more activated serving cells as configured by higher layer signaling for control information. The term monitoring, as used herein, implies attempting, at the UE, to decode each of the PDCCH candidates in the set according to all of the monitored DCI formats.

A physical control channel may be transmitted on an aggregation of one or several CCEs. The CCE(s) may be transmitted consecutively. As previously discussed, one example control channel element may correspond to 9 resource element groups (REGs). Each legacy REG comprises four resource elements. In one embodiment, the number of REGs that are not assigned to a physical control format indicator channel (PCFICH) or a physical hybrid automatic repeat request (ARQ) indicator channel (PHICH) is denoted NREG. The CCEs available in a 3GPP LTE system may be numbered from 0 to NCCE−1, where NCCE=(NREG/9). The PDCCH may support multiple formats. Multiple PDCCHs may be transmitted in a subframe.

The currently described PDCCH transmission and mapping process, as described by the 3GPP LTE Release 8, 9 and 10 specifications, may create limitations to advances that are made in other areas of wireless communication. For example, mapping of CCEs to subframes in OFDM symbols may spread over the control region to provide spatial diversity.

For instance, future networks may be configured HetNets that can include a number of different kinds of transmission nodes in a single macro cell serving area. More UEs can be served simultaneously by macro and pico cells in the HetNet. The 3GPP LTE Rel. 8 PDCCH is designed to demodulate based on cell-specific reference signals, which makes it difficult to fully explore cell splitting gain. The PDCCH design may not be adequate to convey the information needed to allow a UE to take advantage of the multiple transmission nodes in the HetNet to increase bandwidth and decrease battery usage at the UE.

In addition, the use of multi-user multiple-input multiple-output (MU-MIMO), machine to machine communication (M2M), PDSCH transmission in a multicast\broadcast single-frequency network, and cross carrier scheduling in carrier aggregation can require increased capacity for the PDCCH. The use of UE specific reference signals in PDCCH demodulation at the UE can allow the use of multiple nodes in a HetNet. Rather than relying on a single common reference symbol for an entire cell, each reference symbol may be UE specific to provide a beam forming diversity and a cell splitting gain. In addition, interference coordination with neighboring cells may use the mapping procedures to guarantee orthogonality among neighboring cells, thereby reducing or avoiding subcarrier collisions. Moreover, the capacity of the ePDCCH design may be increased for future networks.

Accordingly, an enhanced PDCCH (ePDCCH) may be configured with increased capacity to allow advances in the design of cellular networks and to minimize currently known challenges. Several examples of ePDCCH design and mapping principals will be provided. The examples are not intended to be limiting. Because of the broad design aspects of a ePDCCH, including but not limited to CRC attachment, channel coding, rate matching, multiplexing, scrambling, modulation, layer mapping, precoding, resource mapping, and search space requirements, the examples provided are not intended to limit to a certain system. However, the examples can provide improvements upon which other aspects of an ePDCCH design and implementation can be expanded on.

Figure 4:
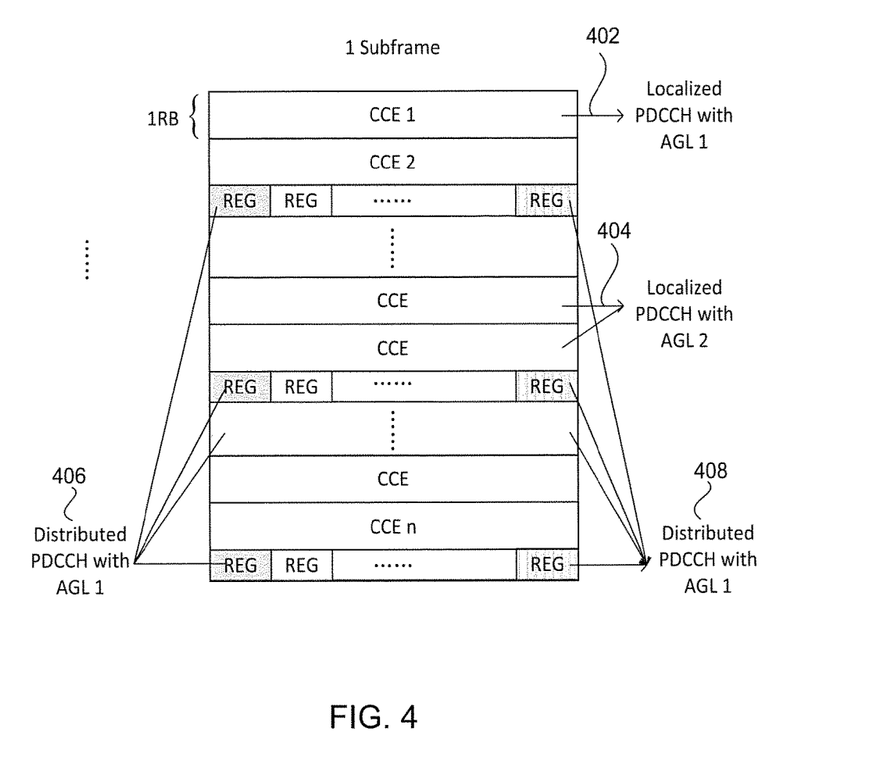
FIG. 4 illustrates a block diagram of an enhanced physical downlink control channel (ePDCCH) mapped to a subframe in accordance with an example.

FIG. 4 provides one example of an ePDCCH that may be mapped into CCEs, with the CCEs mapped to resource elements in a subframe. In this example, each resource block pair may comprise two resource blocks, each having the same subcarriers, located in a first and second slot in a subframe of a radio frame, as shown in FIG. 3. The CCE may be in a defined location within the resource block pair. The CCE may include resource element groups (REGs) that are located throughout the resource block. Each REG may include four resource elements. However, based on system requirements, a REG may include more or less resource elements. In this example, the resource elements located in a REG are contiguous in at least one of frequency and time. The number of REGs in a CCE may be a fixed number, such as nine. Alternatively, the number of REGs may vary based on DCI data load requirements (I.e. the amount of DCI data), or other competing requirements in the resource block, such as PCFICH requirements, PHICH requirements, and resource symbol requirements for data allocated within each resource block. In one embodiment, channel control elements may be mapped to resource elements in a single resource block pair in the subframe. The control channel element may be mapped in frequency and time to the resource elements in the single resource block pair. The resource elements to which the control channel elements are mapped to in the resource block pair may be contiguous in time and/or frequency. Alternatively, the resource elements may be separated in time and/or frequency. The control channel element may be mapped across a slot boundary in the physical resource block pair.

In one embodiment, a relay physical downlink control channel (R-PDCCH) design with non-interleaved UE-RS based mapping may be used for ePDCCH design to achieve scheduling and a beamforming gain when channel state information (CSI) feedback is available. For example, the ePDCCH design may base on a non-cross-interleaved R-PDCH design. However, the current R-PDCCH design may be limited to a relay-specific restriction that mandates the downlink/uplink DCI be transmitted in the first/second slot of a subframe, respectfully. Such restriction is not appropriate for non-relay scenarios and can be removed from ePDCCH design to provide higher scheduling flexibility at eNB, e.g., in the scenario where downlink-uplink traffic has a imbalance. In one embodiment, a UE may monitor resource blocks in both slots for downlink assignment and uplink grant.

In FIG. 4, a localized ePDCCH 402 having aggregation level (AGL) one is shown. The localized ePDCCH may be mapped to a single CCE, which may be mapped within a single resource block pair, as can be appreciated. Similarly, a localized ePDCCH 404 with an aggregation level of two may be mapped to two contiguous CCEs in a resource block. In one embodiment, random beam forming diversity, interference coordination with neighboring cells, and so forth may be further considered for ePDCCH design.

In this regard, one process that may be used is to map an ePDCCH to one or more CCEs. The CCE(s) may then be mapped to a plurality of REGs in different resource blocks.

The frequency separation of the REGs can provide frequency diversity gain. Each REG in a CCE may be mapped to a separate resource block, although more than one REG may be mapped to a same resource block as another REG. The more widely distributed the REGs are, the greater the diversity gain that may occur. In one embodiment, a R-PDCCH design with no cross-interleaving may be utilized for distributed CCE to RE mapping. For example, the distributed ePDCCH design can use UE-RS instead of CRS to be mapped in the RBs for distributed CCE mapping of ePDCCH decoding. The legacy cross-interleaved R-PDCCH design can have some restriction of mandating the downlink/uplink DCI be transmitted in the first/second slot, respectively, of a subframe. The ePDCCH design may remove the restriction to allow greater scheduling flexibility. Further, UEs may be configured to monitor the set of RBs in both slots for downlink assignment and uplink grant. In one embodiment, the ePDCCH may be decoded based on UE-RS and the REGs in different RBs may be precoded by different precoder to realize random beamforming gain and achieve spatial domain diversity. The precoder for each RB pair or RB pair bundling may be predefined or randomly selected by a eNB.

In one embodiment, each REG may be distributed to resource blocks that are separated from another resource block containing a REG for the CCE by a frequency that is at least five times a coherent bandwidth of the PDCCH carrier frequency. However, the ability to separate the REGs in frequency may depend on a specific channel profile and system bandwidth. In instances where a relatively narrow bandwidth is available, each REG may only be separated by two times the coherent bandwidth of the PDCCH carrier frequency. In another embodiment, a REG may be separated from another REG in a CCE by a single resource block. Overall, each REG may be separated in frequency from other REGs in a CCE as far as possible to gain frequency diversity.

FIG. 4 contains one example of a distributed PDCCH 406 having an aggregation level of one. The aggregation level of one implies that the DCI information is able to be mapped to a single CCE. The CCE may contain 9 REGs. However, a lesser or a greater number of REGs may be used in each CCE. If a different modulation scheme than QPSK is used on the DCI information, a greater number of REs and/or bits may be contained in each REG. The REGs in the CCE may be mapped to resource blocks in a subframe that are separated in frequency as much as possible, depending on the channel profile and system bandwidth to provide frequency diversity gain. Similarly, the REGs for CCE N 408 are distributed in frequency. The REGs in CCE 1 and CCE N may have the same distribution or different distribution amongst resource blocks in a subframe. While the REGs illustrated in the distributed PDCCH 406 and 408 are each shown to be in the same time position within a resource block, for each respective CCE, this is not required. The distributed REGs in CCE 1 and CCE N may be in a different temporal location within a resource block. Each CCE in a subframe may have a same number of REGs or a different number of REGs.

The distribution of the REGs in a CCE over frequency to different resource blocks in a subframe can provide an increase in frequency diversity gain. In addition, different frequency mapping schemes may be used in neighboring transmission stations that can significantly reduce or eliminate potential subcarrier collisions occurring for mobile devices operating near a cell edge of the neighboring transmission stations. Moreover, the frequency distributed ePD- CCH can allow the use of random beam forming diversity to provide additional gain, thereby increasing the distance and/or bit rate at which the ePDCCH can be communicated.

Figure 5:
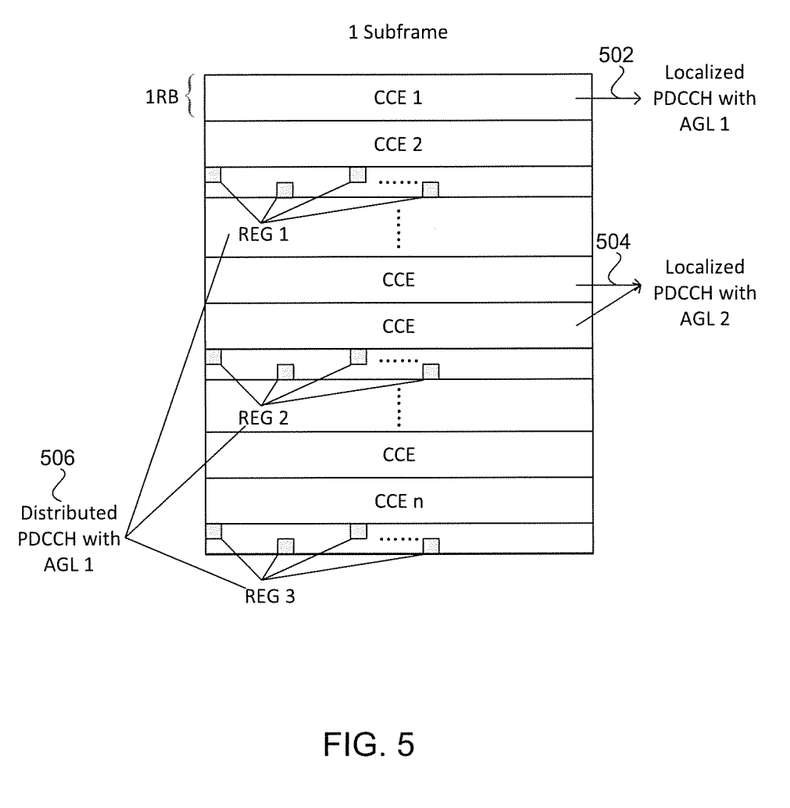
FIG. 5 illustrates a block diagram of an enhanced physical downlink control channel (ePDCCH) mapped to a subframe in accordance with an additional example.

FIG. 5 provides another example of a process for mapping a CCE to resource elements and/or resource blocks in a subframe of a radio frame. The localized ePDCCH examples 502, 504 with aggregation levels 1 and 2, respectively, can be substantially similar to the examples 402, 404 in FIG. 4. The distributed ePDCCH 506 with aggregation level one in CCE 1 is shown to be distributed both in frequency and time. In addition, the REGs may be divided into sub-groups that may be distributed in time and space within a resource block group. A REG having resource elements that are distributed in both time and frequency can be referred to as a distributed REG.

In one embodiment, each distributed REG may include from four to 16 resource elements. The resource elements in a distributed REG are mapped to selected locations in a resource block and/or resource block pair. In one embodiment, all of the resource elements in a distributed REG may be contained in the same resource block. Alternatively, the resource elements in a distributed REG may be mapped to more than one resource block pair in a subframe.

In one example, legacy PDCCH mapping values may be used. The distributed ePDCCH 506 may include nine REGs which each contain four resource elements, with each resource element containing two bits. The distributed ePDCCH may be mapped to nine separate resource blocks, with each resource block including one distributed REG. Each distributed REG may include four resource elements that are distributed throughout the resource block. For a PDCCH with a greater aggregation level, the PDCCH may be mapped to additional CCEs that may be similarly distributed. A precoder that is in the same CCE in the same resource block can be applied to the REG to realize some random beam forming, thereby providing spatial diversity gain. UEs can also utilize this kind of structure to decode in different search space categories that depend on the mobility of the UE's themselves. This can be used to decrease blind decoding attempts. This example is not intended to be limiting. As previously discussed, the CCE in an ePDCCH may include a greater (or lesser) number of REGs, each REG may contain a greater number of resource elements, and each resource element may contain a greater number of bits, depending on the type of modulation used.

The set of ePDCCH candidates to monitor are defined in terms of search spaces, where a search space $S_k^{(L)}$ at aggregation level $L \in \{1,2,4,8\}$ is defined by a set of ePDCCH candidates. For each serving cell on which ePDCCH is monitored, the CCEs corresponding to ePDCCH candidate m of the search space $S_k^{(L)}$ are given by:

$$L\{(Y_k+m') \bmod \lfloor N_{CCE,k}/L \rfloor\}+i$$

where $Y_k$ is defined below, i=0, ..., L−1. For the common search space m'=m. If the monitoring UE, for a UE specific search space, is configured with a carrier indicator field then m'=m+$M^{(L)} \cdot n_{CI}$ where $n_{CI}$ is the carrier indicator field value. If the monitoring UE, for a UE specific search space, is not configured with a carrier indicator field then m'=m, where m=0, ..., $M^{(L)}$−1. $M^{(L)}$ is the number of ePDCCH candidates to monitor in the given search space.

A UE specific search space design for ePDCCH may be configured to takes into account both low mobility and high mobility UEs. For low mobility, the search space candidates may be selectively chosen across different subbands to maximize scheduling gain offered by a channel state information feedback that is available. For high mobility, the search space may be configured to allow the UE-RS based OL-MIMO be implemented for ePDCCH to take advantage of a diversity gain offered by the UE-RS base OL-MIMO scheme. High mobility UEs may have a larger Doppler shift, move between cells more often, and require more frequent data exchanges with an eNode B to maintain fresh data such as reference signal information.

For low mobility, frequency scheduling gain can be achieved using localized ePDCCH search space candidates, such as localized ePDCCH 402 and 404 in FIG. 4. For high mobility, search space candidates may be distributed widely across different frequency sub-bands in the OFDMA signal, such as in the distributed ePDCCH 406 and 408 in FIG. 4 or 506 in FIG. 5. The wide distribution of the search space candidates in the OFDMA signal can provide a scheduling gain caused by the reception of reliable channel state information feedback from the UE to the eNode B. For high mobility, the search space may be configured to allow open loop (OL) multiple-input multiple output (MIMO) to be implemented with UE specific reference signals for the ePDCCH.

Based on the examples illustrated in FIGS. 4 and 5, a number of design principles for an ePDCCH can be derived. An ePDCCH may be mapped into either one or multiple control channel elements. When one ePDCCH is mapped into multiple CCEs, each CCE may be used to decode an ePDCCH. One CCE may be mapped to resource elements within one physical resource block (RB) or RB pair. One CCE may be mapped to distributed resource blocks that are relatively far apart in the frequency domain. A localized ePDCCH may be mapped to multiple localized CCEs. The localized CCEs may be mapped within one resource block, or to multiple resource blocks that are contiguous in the frequency domain. A distributed ePDCCH may be mapped to one CCE or multiple distributed CCEs. The localized CCEs may be mapped to distributed resource blocks that are distributed as far apart from each other in the frequency domain as is possible based on the channel, system bandwidth, and other system considerations, as can be appreciated. One subframe may contain either localized CCEs, distributed CCEs, or both. One physical resource block may also contain either localized CCEs or part of a distributed CCE or both. The resource elements to which the CCE is mapped may exclude those that are assigned to reference symbols or other overhead.

After the number of cell specific reference signal ports, demodulation specific reference signal ports, channel state information reference signal ports are configured in a resource block by a higher layer, such as radio resource control (RRC) signaling, a CCE can be indexed based on the available resource elements in the resource blocks that are assigned for ePDCCH transmission.

In one embodiment, for ePDCCH signals received from relatively low mobility UEs, localized CCEs can be indexed based on the order in frequency, as illustrated in FIG. 1. In another embodiment, for ePDCCH signals received from relatively high mobility UEs, the CCE can be indexed to resource elements that are either: contiguous in time or frequency, as shown in FIG. 1; or distributed in time and frequency, as shown in FIG. 2. The use of the distributed REGs in FIG. 2 can provide more diversity gain, especially for an ePDCCH with a low aggregation level. For high mobility UEs, the CCE can be indexed to resource elements as previously discussed for the distributed PDCCH 406 and 408 in FIG. 4.

In one embodiment, CCEs may be indexed into REGs that are divided into two categories, depending on their function:

one set of REGs for low mobility, and another set of REGs for high mobility. For each category, the search space may be defined where a ePDCCH candidate m=0, 1 K M(Λ)−1 at aggregation level Λ comprises a CCE numbered with $n_{cce}^{PDCCH} = (\Lambda \times m + i) \mod N_{CCE}^{PDCCH}$, where $N_{CCE}^{PDCCH}$ is the total number of CCEs for the selected category, i=0, 1 K, Λ−1 and M(Λ) is a number of ePDCCH candidates based on the aggregation level Λ. Additional ePDCCH candidates based on aggregation levels may also be employed, as can be appreciated.

Figure 6:
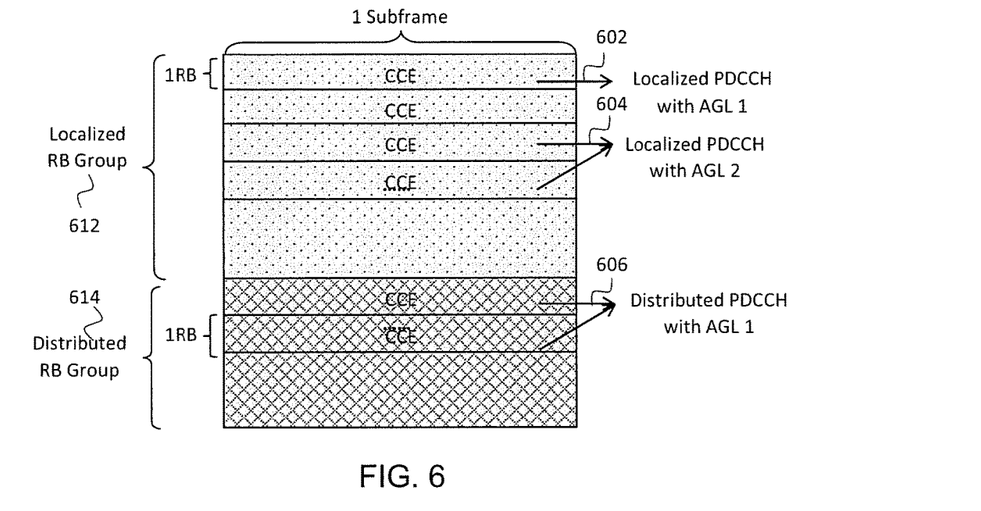
FIG. 6 illustrates a block diagram of an enhanced physical downlink control channel (ePDCCH) mapped to a subframe in accordance with an additional example, wherein a resource block partition for localized and distributed CCE mapping is shown.

FIG. 6 provides one example of a hybrid scheme that supports both localized ePDCCHs and distributed ePDCCHs in one subframe. In this example, each resource block pair may comprise two resource blocks, each having the same subcarriers, located in a first and second slot in a subframe of a radio frame, as shown in FIG. 3. The CCE may be in a defined location within the resource block. However, the CCE may include resource element groups (REGs) that are located throughout the resource block. Each REG may include four resource elements. However, based on system requirements, a REG may include more or less resource elements. In this example, the resource elements located in a REG are contiguous in at least one of frequency and time. The number of REGs in a CCE may be a fixed number, such as nine. Alternatively, the number of REGs may vary based on DCI data load requirements (I.e. the amount of DCI data), or other competing requirements in the resource block, such as PCFICH requirements, PHICH requirements, and resource symbol requirements for data allocated within each resource block. In one embodiment, channel control elements may be mapped to resource elements in a single resource block pair in the subframe. The control channel element may be mapped in frequency and time to the resource elements in the single resource block pair. The resource elements to which the control channel elements are mapped to in the resource block pair may be contiguous in time and/or frequency. Alternatively, the resource elements may be separated in time and/or frequency. The control channel element may be mapped across a slot boundary in the physical resource block pair.

Figure 7:
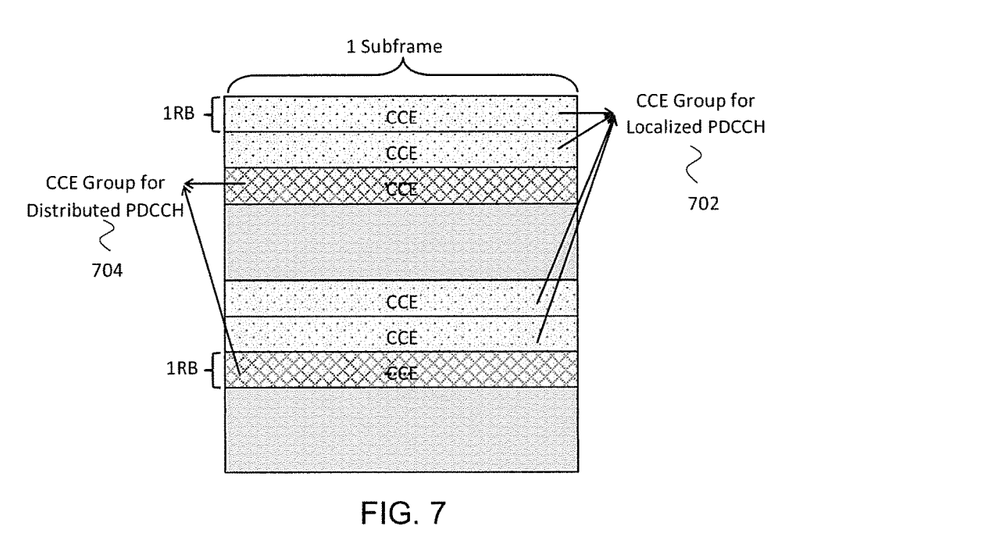
FIG. 7 illustrates a block diagram of an enhanced physical downlink control channel (ePDCCH) mapped to a subframe in accordance with an additional example, wherein a resource block partition for localized and distributed CCE mapping is shown.

As shown in FIG. 6, eNB may divide the resource blocks allocated to ePDCCH into a localized RB group 612 that may be used for low mobility UEs with good CSI information and a distributed RB group 614 that may be used for higher mobility UEs or when precise CSI information is not available. The localized RB group 612 may comprise a set of one or more RBs for localized CCE to RE mapping. The distributed RB group 614 may comprise a set of one or more RBs for distributed CCE to RE mapping. In one embodiment, the RBs in the localized RB group 612 may be contiguous in time and/or frequency. The RBs in the distributed RB group 614 may be contiguous in time and/or frequency. However, in some embodiments, the RBs in a localized RB group or a distributed RB group may not be contiguous in time and/or frequency, as shown in the example of FIG. 7.

In FIG. 6, a localized ePDCCH 602 having aggregation level (AGL) of one is shown. The localized ePDCCH 602 may be mapped to a single CCE in a resource block, which is in the localized RB group 612. Similarly, a localized ePDCCH 604 having aggregation level of two may be mapped to two contiguous CCEs in a resource block, which may belong to the localized RB group 612. In another embodiment, the localized CCE to RE mapping as described with regard to FIGS. 4 and 5 may be used for the localized CCE to RE mapping in the hybrid ePDCCH design of FIG. 6.

FIG. 6 contains one example of a distributed ePDCCH 606 having an aggregation level of one. The aggregation level of one implies that the DCI information is able to be mapped to a single CCE. The CCE may contain 9 REGs that may mapped to resource blocks in a subframe that are separated in frequency as much as possible, depending on the channel profile and system bandwidth to provide frequency diversity gain. However, a lesser or a greater number of REGs may be used in each CCE. If a different modulation scheme than QPSK is used on the DCI information, a greater number of REs and/or bits may be contained in each REG. As shown in FIG. 6, the resource blocks, to which the REGs mapped may be in the distributed RB group 614. In another embodiments, the distributed CCE to RE mapping as described with regard to FIGS. 4 and 5 may be used for the distributed CCE to RE mapping in the hybrid ePDCCH design of FIG. 6.

Although FIG. 6 illustrates a localized RB group and a distributed RB group, in some embodiments, the eNB may be configured to form more localized RB group and/or more distributed RB group. In another embodiment, the eNB may be configured to group a fixed number of RBs in each localized RB group; however, in some embodiments, the number of RBs in each localized RB group may not be the same. Similarly, the eNB may be configured to group a fixed number of RBs in each distributed RB group; however, in some embodiments, the number of RBs in each distributed RB group may not be the same. In some embodiment, a localized RB group may comprise the same number of RBs as a distributed RB group; however, in some embodiment, this may not be required. The one or more localized RB groups may be contiguous in time and/or frequency; however, in some embodiments, the one or more localized RB groups may be interleaved with the one or more distributed RB groups.

FIG. 7 shows another example of a hybrid ePDCCH design that supports both localized ePDCCHs and distributed ePDCCHs. In this example, a localized RB group 712 and a distributed RB group 714 are shown. The localized RB group 702 may comprise a plurality of resource blocks that are allocated for localized CCE to RE mapping. The distributed RB group 704 may comprise a plurality of resource blocks that are allocated for distributed CCE to RE mapping. As shown in the example of FIG. 7, the RBs in the localized RB group 702 or the distributed RB group 704 may not be contiguous in time and/or frequency and may be distributed in time and/or frequency across the whole band to achieve more diversity gain. The localized CCE to RE mapping and distributed CCE to RE mapping as described with regard to FIGS. 4 and 5 may be used for the localized CCE to RE mapping and distributed CCE to RE mapping, respectively, in the hybrid ePDCCH design of FIG. 7.

Figure 8:
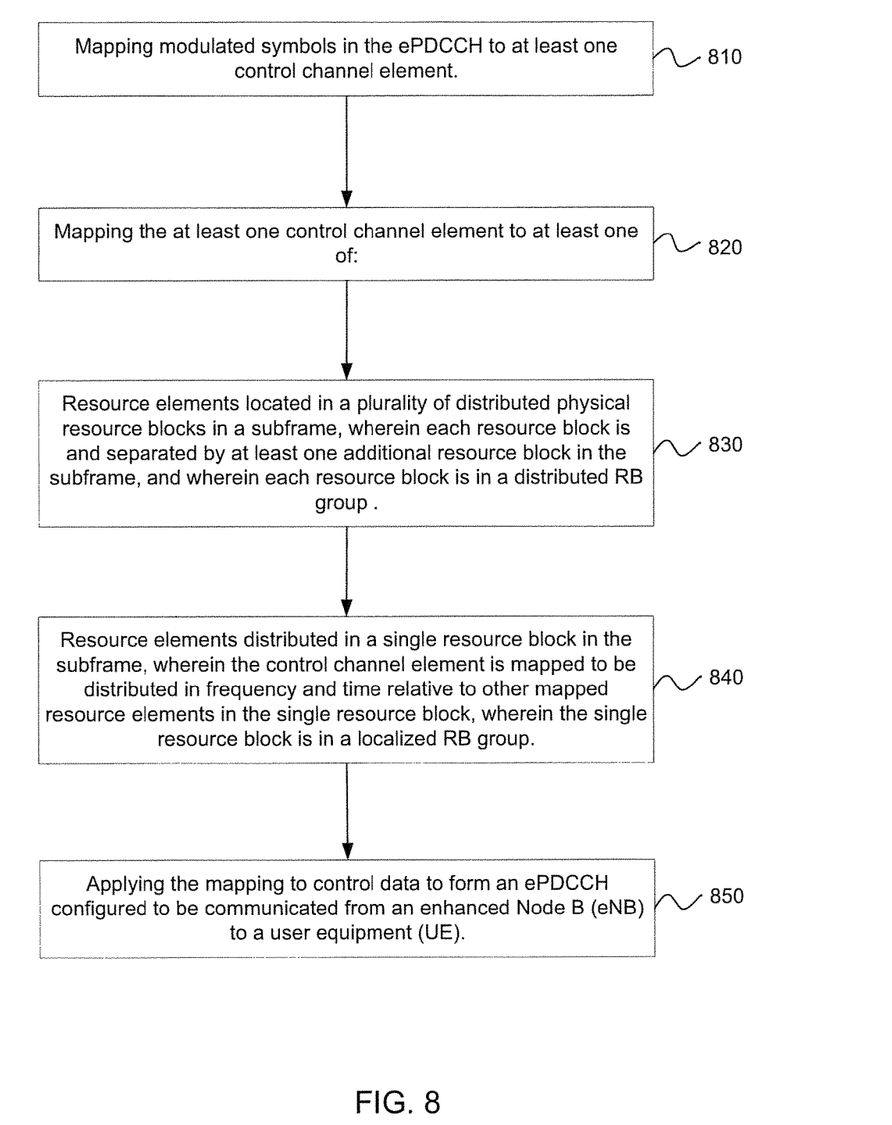
FIG. 8 illustrates a flow chart depicting a method for mapping an enhanced physical downlink control channel (ePDCCH) to physical resource blocks in a radio frame in accordance with an example.

In one example, FIG. 8 provides a flow chart that depicts a method for mapping an enhanced physical downlink control channel (ePDCCH) to physical resource blocks in a radio frame. The method comprises mapping modulated symbols in the ePDCCH to at least one control channel element, as shown in block 810. The at least one control channel element may be mapped 820 to at least one of: resource elements located in a plurality of physical resource blocks in a subframe, wherein each resource block is separated by at least one additional resource block in the subframe, and wherein each resource block are in a distributed RB group that comprises resource blocks for distributed CCE to RE mapping; and resource elements distributed in a single resource block in the subframe, wherein the control channel element is mapped to be distributed in frequency and time relative to other mapped resource elements in the single resource block, and wherein the single resource block is in a localized RB group that comprises resource blocks for localized CCE to RE mapping, as shown in blocks 830 and 840, respectively. The method 600 further comprises applying the mapping to control data to form an ePDCCH configured to be communicated from an enhanced Node B to a UE, as shown in block 850.

The method 600 may also include mapping the at least one control channel element to resource elements in a single resource block pair in the subframe. The control channel element may be distributed in frequency and time to the resource elements in the single resource block pair. In addition, the modulated symbols in the ePDCCH may be mapped to the single resource block pair, wherein the control channel element is mapped across a slot boundary in the physical resource block pair.

Another example in the method 600 comprises mapping the at least one control channel element to resource elements located in the plurality of physical resource blocks in the subframe, wherein each resource block is contiguous in frequency. The at least one control channel element may be mapped to the resource elements located in the subframe and to the single resource block in the subframe. The single resource block may contain both contiguous resource elements and resource elements that are distributed in frequency and time to which the control channel element is mapped.

The method 600 further comprises mapping symbols in a localized ePDCCH to a plurality of control channel elements; and mapping the plurality of control channel elements to physical resource blocks that are contiguous in the subframe. The at least one control channel element may be mapped to the resource elements located in the plurality of physical resource blocks in the subframe. The resource elements may be grouped into a plurality of resource element groups. Each resource element group may consist of four resource elements that are contiguous in at least one of time and frequency.

The method 600 also includes forming distributed resource element groups in one of the plurality of physical resource blocks and the single resource block. Each distributed resource element group consists of at least four resource elements that are distributed in time and frequency within a resource block.

The method 600 additionally includes forming an individual index of the at least one control channel elements that are mapped to the resource elements in the resource blocks in the subframe of a radio frame. A global index of the at least one control channel elements that are mapped to the resource elements in the resource blocks in the subframe is also disclosed.

In another embodiment, an article is disclosed. The article comprises a non-transitory computer-readable storage medium containing instructions that, if executed by a processor, enable a system to apply mapping to control data operable to form an extended physical downlink control channel (ePDCCH) configured to be communicated from an enhanced Node B (eNB) to a user equipment (UE) in a radio frame. The mapping is formed by mapping modulated symbols in the ePDCCH to at least one of at least one localized control channel element and at least one distributed control channel element, wherein: the at least one localized control channel element is mapped within a physical resource block or multiple physical resource blocks that are contiguous in the frequency domain on a subframe of the radio frame; and the at least one distributed control channel element is mapped to distributed resource elements in at least one physical resource block in the subframe of the radio frame.

The article may further comprise instructions that when executed by a processor enable the system to apply mapping to control data operable to form the ePDCCH configured to be communicated from the eNB to the UE in the radio frame. The mapping may be formed by mapping the modulated symbols in the ePDCCH to the at least one distributed control channel element that is mapped to multiple localized physical resource blocks that are distributed in frequency in the subframe.

The article may further comprise instructions that when executed by a processor enable the system to apply mapping to control data operable to form the ePDCCH configured to be communicated from the eNB to the UE in the radio frame. The mapping may be formed by mapping the at least one localized control channel element and the at least one distributed control channel element to physical resource blocks in the subframe of the radio frame. The subframe may include at least one of the mapped localized control channel elements and the at least one mapped distributed control channel element.

The article may further comprise instructions that when executed by a processor enable the system to apply mapping to control data operable to form the ePDCCH configured to be communicated from the eNB to the UE in the radio frame. The mapping may be formed by mapping the at least one localized control channel element and the at least one distributed control channel element to a physical resource block in the subframe of the radio frame, wherein the at physical resource block includes at least one of the mapped localized control channel elements and at least one of the mapped distributed control channel elements.

In another embodiment, an apparatus is disclosed that comprises an enhanced Node B (eNB) operable to apply mapping to control data operable to form an extended physical downlink control channel (ePDCCH) configured to be communicated to a user equipment (UE) in a radio frame. The mapping is formed by mapping modulated symbols in the ePDCCH to at least one of at least one localized control channel element and at least one distributed control channel element, wherein: the at least one localized control channel element is mapped within a physical resource block or multiple physical resource blocks that are contiguous in the frequency domain on a subframe of the radio frame; and the at least one distributed control channel element is mapped to distributed resource elements in at least one physical resource block in the subframe of the radio frame.

In another embodiment, the eNB may be further configured to apply mapping to control data operable to form the ePDCCH configured to be communicated from the eNB to the UE in the radio frame. The mapping may be formed by mapping the modulated symbols in the ePDCCH to the at least one distributed control channel element that is mapped to multiple localized physical resource blocks that are distributed in frequency in the subframe.

In another embodiment, the eNB may be further configured to apply mapping to control data operable to form the ePDCCH configured to be communicated from the eNB to the UE in the radio frame. The mapping may be formed by mapping the at least one localized control channel element and the at least one distributed control channel element to physical resource blocks in the subframe of the radio frame, wherein the subframe includes at least one of the mapped localized control channel element and the mapped distributed control channel element.

In another embodiment, the eNB may be further configured to apply mapping to control data operable to form the ePDCCH configured to be communicated from the eNB to the UE in the radio frame. The mapping may be formed by mapping the at least one localized control channel element and the at least one distributed control channel element to a physical resource block in the subframe of the radio frame, wherein the physical resource block includes at least one of the mapped localized control channel elements and at least one of the mapped distributed control channel elements.

In another embodiment, the eNB may be further configured to apply mapping to control data operable to form the ePDCCH configured to be communicated from the eNB to the UE in the radio frame. The mapping may be formed by mapping the at least one localized control channel element and the at least one distributed control channel element to a physical resource block in the subframe of the radio frame, wherein the physical resource block includes at least one of the mapped localized control channel elements and at least one of the mapped distributed control channel elements.

In another embodiment, the eNB may be further configured to divide the physical resource blocks allocated to the ePDCCH into at least a first group comprising a plurality of one or more resource blocks for localized control channel elements and at least a second group comprising a plurality of one or more resource blocks for distributed control channel elements. The eNB may be further configured to apply mapping to control data operable to form the ePDCCH configured to be communicated from the eNB to the UE in the radio frame. The mapping may be formed by mapping the at least one localized control channel element to a physical resource block in the subframe of the radio frame, which is from the localized resource block group designated for the localized mapping; and mapping the at least one distributed control channel element to a physical resource block in the subframe of the radio frame, which is from the distributed resource block group designated for the distributed mapping.

In another embodiment, the eNB may be further configured to adjust or configure the ratio and the partition of localized vs. distributed resource block groups used for the localized and distributed mapping, respectively, through RRC signaling for long term adjustment. For example, the eNB may be further configured to provide a RRC signal that may comprises one or more bits corresponding to one or more localized and/or distributed RBs in the RB groups, respectively.

In another embodiment, the eNB may be further configured to quantize or adjust the ratio and the partition of localized vs. distributed resource blocks used for the localized and distributed mapping, respectively, by one or more bits through system information blocks (SIB) for short term adjustment.

In another embodiment, the eNB may be further configured to design a number and/or an arrangement of RBs in a localized RB groups and a distributed RB group, respectively.

Figure 9:
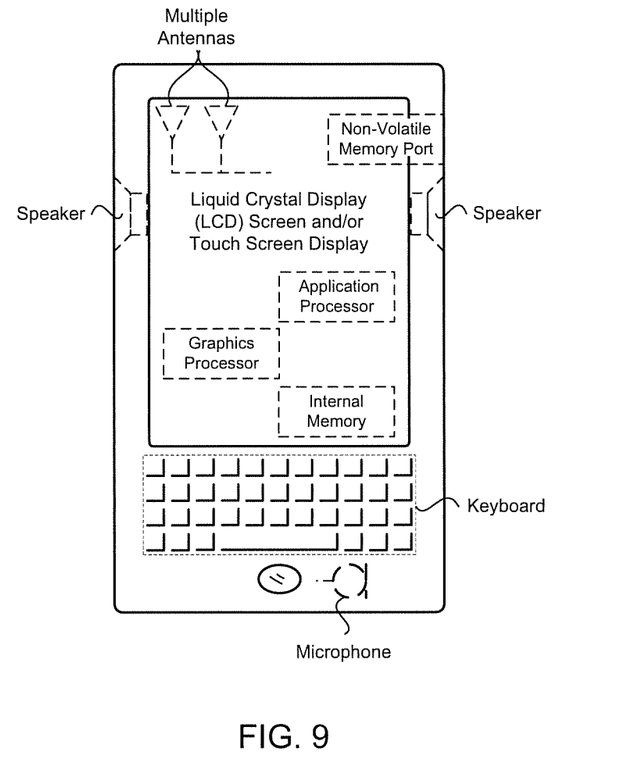
FIG. 9 illustrates an example of a block diagram of a mobile communication device in accordance with an example.

FIG. 9 provides an example illustration of a mobile device, such as a user equipment (UE), a mobile station (MS), a mobile wireless device, a mobile communication device, a tablet, a handset, or other type of mobile wireless device. The mobile device may include one or more antennas configured to communicate with a base station (BS), an evolved Node B (eNB), or other type of wireless wide area network (WWAN) access point. While two antennas are shown, the mobile device may have between one and four or more antennas. The mobile device may be configured to communicate using at least one wireless communication standard including Third Generation Partnership Project Long Term Evolution (3GPP LTE), Worldwide interoperability for Microwave Access (WiMAX), High Speed Packet Access (HSPA), Bluetooth, WiFi, or other wireless standards. The mobile device may communicate using separate antennas for each wireless communication standard or shared antennas for multiple wireless communication standards. The mobile device may communicate in a wireless local area network (WLAN), a wireless personal area network (WPAN), and/or a wireless wide area network (WWAN).

FIG. 9 also provides an illustration of a microphone and one or more speakers that may be used for audio input and output from the mobile device. The display screen may be a liquid crystal display (LCD) screen, or other type of display screen such as an organic light emitting diode (OLED) display. The display screen may be configured as a touch screen. The touch screen may use capacitive, resistive, or another type of touch screen technology. An application processor and a graphics processor may be coupled to internal memory to provide processing and display capabilities. A non-volatile memory port may also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Figure 10:
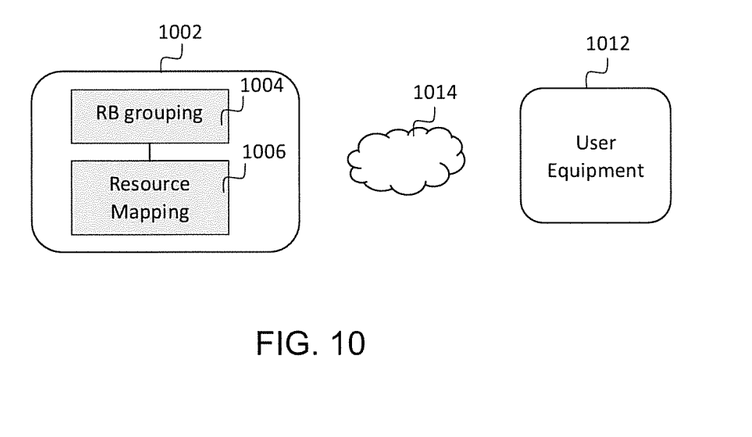
FIG. 10 illustrates an example of a block diagram of a eNB and a UE.

FIG. 10 provides an example illustration of communication between a eNB 1002 and a mobile device 1012, such as a user equipment (UE), a mobile station (MS), a mobile wireless device, a mobile communication device, a tablet, a handset, or other type of mobile wireless device. A description on the mobile device 1012 may refer to the embodiments as mentioned with regard to FIG. 9. The mobile device 1012 may include one or more antennas configured to communicate with a base station (BS), an evolved Node B (eNB), or other type of wireless wide area network (WWAN) access point via a network 1014.

FIG. 10 also provides an illustration of a RB grouping module 1004 that may be coupled to a resource mapping module 1006. Although FIG. 10 illustrates two modules in eNB 1002, in some embodiments, eNB 1002 may comprise additional modules. In one embodiment, the RB grouping module 1004 may be configured to group RBs into one or more localized RB groups and/or one or more distributed RB groups. In another embodiment, the resource mapping module 1006 may perform resource mapping to form a ePDCCH, to be transmitted to the mobile device 1012, based on the ratio and the partition of the localized RB groups and the distributed RB groups determine by the RB grouping module, e.g., as mentioned with regard to FIG. 9. The RB group information may be transmitted by the eNB 1002 to the mobile device 1012 via RRC signaling for long term adjustment or SIB signaling for short term adjustment. The UE 1012 may use the RRC signaling and SIB signaling to perform ePDCCH blind decoding based on the corresponding search space.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as an equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as equivalents of one another, but are to be considered as separate and autonomous representations of the present invention.

Furthermore, the described features, structures, or characteristics may be combined in any suitable manner in one or more embodiments. In the following description, numerous specific details are provided, such as examples of search spaces, to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation may be made without the exercise of inventive faculty, and without departing from the principles and concepts of the invention. Accordingly, it is not intended that the invention be limited, except as by the claims set forth below.

While the methods of FIGS. 1, 2 and 8 is illustrated to comprise a sequence of processes, the methods in some embodiments may perform illustrated processes in a different order.

While certain features of the invention have been described with reference to embodiments, the description is not intended to be construed in a limiting sense. Various modifications of the embodiments, as well as other embodiments of the invention, which are apparent to persons skilled in the art to which the invention pertains are deemed to lie within the spirit and scope of the invention.

What is claimed is:

1. A system, comprising:
   circuitry to provide a resource mapping module to map modulated symbols in a plurality of extended physical downlink control channels (ePDCCHs) to resource blocks (RBs) of a localized RB group (RBG) using localized control channel element (CCE)-to-resource element (RE) mapping and to RBs of a distributed RBG using distributed CCE-to-RE mapping, wherein the RBs of the localized RB group and the distributed RB group are in a subframe; and
   a transmitter to transmit the plurality of ePDCCHs.

2. The system of claim 1, wherein the localized RB group is contiguous in frequency and the distributed RB group is contiguous in frequency.

3. The system of claim 1, wherein the localized RB group is not contiguous in frequency and the distributed RB group is not contiguous in frequency.

4. The system of claim 1, further comprising:
   circuitry to provide a resource block (RB) grouping module to adjust a ratio or a partition of the localized RBG and the distributed RBG, respectively.

5. The system of claim 4, further comprising:
   a quantizer to quantize the ratio or the partition of the localized RBG and the distributed RBG, respectively.

6. The system of claim 1, wherein the resource mapping module is further to:
   map a distributed ePDCCH to resource elements of a plurality of RBs of the distributed RBG, wherein the plurality of RBs includes a first RB of a first RB pair and a second RB of a second RB pair.

7. The system of claim 1, wherein the resource mapping module is further to:
   map a localized ePDCCH to resource elements of a single RB pair of the localized RBG.

8. One or more non-transitory, computer-readable media having instructions that, when executed by one or more processors, cause a device to:
   map modulated symbols in a plurality of extended physical downlink control channels (ePDCCHs) to resource blocks (RBs) of a localized RB group (RBG) using localized control channel element (CCE)-to-resource element (RE) mapping and to RBs of a distributed RBG using distributed CCE-to-RE mapping, wherein the RBs of the localized RB group and the distributed RB group are in a subframe; and
   cause transmission of the plurality of ePDCCHs.

9. The one or more non-transitory, computer-readable media of claim 8, wherein the localized RBG is contiguous in frequency and the distributed RBG is contiguous in frequency.

10. The one or more non-transitory, computer-readable media of claim 8, wherein the localized RBG is not contiguous in frequency and the distributed RBG is not contiguous in frequency.

11. The one or more non-transitory, computer-readable media of claim 8, wherein the instructions, when executed, further cause the device to:
   adjust a ratio or a partition of the localized RBG and the distributed RBG, respectively.

12. The one or more non-transitory, computer-readable media of claim 11, wherein the instructions, when executed, further cause the device to:
   quantize the ratio or the partition of the localized RBG and the distributed RBG, respectively.

13. The one or more non-transitory, computer-readable media of claim 8, wherein the instructions, when executed, further cause the device to:
   map a distributed ePDCCH to resource elements of a plurality of RBs of the distributed RBG, wherein the plurality of RBs includes a first RB of a first RB pair and a second RB of a second RB pair.

14. The one or more non-transitory, computer-readable media of claim 8, wherein the instructions, when executed, further cause the device to:
   map a localized ePDCCH to resource elements of a single RB pair of the localized RBG.

* * * * *